April 16, 1957     L. J. LINDEMANN     2,788,603
FISH LURE
Filed Oct. 29, 1953

INVENTOR.
LAWRENCE J. LINDEMANN
BY
ATTORNEY

р

United States Patent Office 2,788,603
Patented Apr. 16, 1957

2,788,603
FISH LURE

Lawrence J. Lindemann, McGregor, Iowa

Application October 29, 1953, Serial No. 389,105

1 Claim. (Cl. 43—26.2)

This invention relates in general to fish lures and in particular to an artificial fish that has movable gills and tail.

As is well known to those skilled in the art of fishing certain fish are caught easier on moving bait. One method of causing artificial bait to move is to use a casting rod and draw the bait through the water by turning the reel.

It is an object of this invention to provide a simulated live bait for fishing.

Another object of this invention is to provide a fish bait which has movable tail and gills when drawn through the water.

Yet another object of this invention is to provide an improved artificial fish bait.

A feature of this invention is found in the provision for an artificial fish bait which has a generally elongated body portion with a tail pivoted at one end and gills pivotally supported adjacent the other end. A longitudinal shaft is rotatably supported by the body member and carries a propeller that rotates the shaft. The shaft actuates the tail and the gills.

Further objects, features and advantages of this invention will become apparent from the following description and claim wherein the drawings represent respectively:

Figure 1:
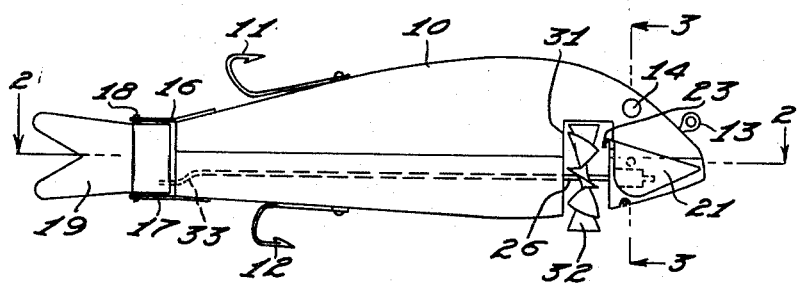
Figure 1 is a side view of this invention.

Figure 1 shows a generally elongated body portion 10 which has a pair of hooks 11 and 12 mounted to the upper and lower sides thereof. A tow ring 13 is attached to the forward end of the body portion and is used for tying the fish line thereto. A pair of eyes 14 mounted in the forward end of the body portion which simulates the head of a fish. A pair of supporting rods 16 and 17 are attached to opposite sides of the rear end as shown.

A vertical shaft 18 is supported between the members 16 and 17 and pivotally supports a tail fin 19. Attached to either side of the head are fins 21 and 22 which are pivotally supported by shafts 23 and 24 from their top edges. The upper edges of the fins 21 and 22 are formed into longitudinal openings through which the shafts 23 and 24 extend. The shafts 23 and 24 are supported on the head by supporting bearing, not shown, which hold them slightly out from the surface of the head. The shafts 23 and 24 extend forwardly and downwardly from the slot 31.

Figure 2:
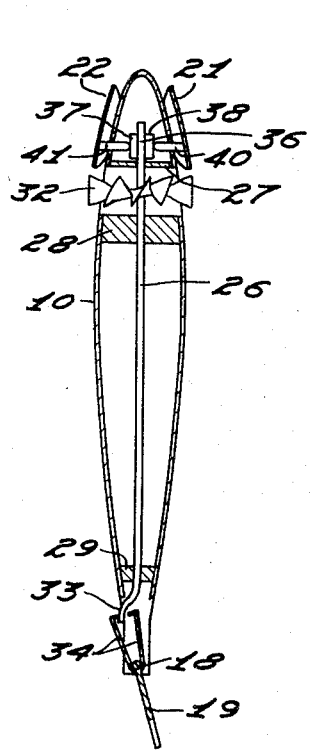
Figure 2 is a sectional view taken on line 2—2 from Figure 1.

As best shown in the sectional view Figure 2 a shaft 26 is rotatably supported within the body portion by means of transverse supporting members 27, 28 and 29. A slot 31 is formed in the body portion rearwardly of the fins 21 and 22. A propeller 32 is mounted on the shafts 26 within the slot 31 and drives the shaft as the lure moves through the water.

The rear end of shaft 26 is formed into a crank 33. The tail fin 19 is formed with a bifurcated portion 34. The crank 33 fits between the bifurcation of the tail fin and causes it to oscillate as the shaft 26 rotates.

Figure 3:
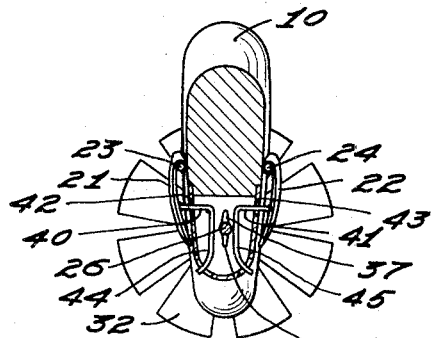
Figure 3 is a sectional view taken on line 3—3 of Figure 1.

The forward end 36 of shaft 26 has a pair of projections 37 and 38 which extend from either side thereof. As best seen in the sectional view Figure 3 the fin members 21 and 22 have L-shaped members 40 and 41 attached thereto that extend through the wall of the body member 10 through openings 42 and 43. The inner ends 44 and 45 of the L-shaped members terminate adjacent to projections 37 and 38 and are engaged thereby as shaft 26 rotates. This causes the gills 21 and 22 to oscillate.

Figure 4:
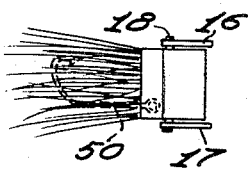
Figure 4 is a detailed view of a modification of the tail of this invention.

Figure 4 illustrates a modification wherein a pivoted hook 50 may be mounted in place of the tail fin 19. The hook 50 may be camouflaged similar to the manner in which fish fly lures are constructed.

In operation, the lure is attached to the fish line and cast into the water. As the lure is trolled the propeller 32 rotates thus causing the tail fin 19 and gills 21 and 22 to oscillate.

It is seen that this invention provides a new and novel fish lure. Although it has been described with respect to particular embodiments, it is not to be so limited as changes and modifications may be made which are within the full intended scope of the appended claim.

I claim:

A fish lure comprising, an elongated body portion, a shaft mounted longitudinally within the body portion, the rear end of said shaft formed into a crank, a pair of projections attached to the forward end of said shaft, said body being provided with a slot extending transversely through the body portion, a propeller mounted on said shaft within the slot, a tail fin pivotally supported from the rear end of the body portion, the crank of said shaft engageable with said tail fin to oscillate it and a pair of gills pivotally supported from the body portion adjacent the forward end of said shaft about an axis extending substantially longitudinally of the lure body, a pair of L-shaped arms attached to said gills and extending within the confines of said body portion, said projections engageable with the ends of said L-shaped arms, and a plurality of hooks attached to said body portion.

References Cited in the file of this patent

UNITED STATES PATENTS

| | | |
|---|---|---|
| 2,333,425 | Jackson | Nov. 2, 1943 |
| 2,472,505 | Yocam et al. | Jan. 7, 1949 |
| 2,476,934 | Watkins | July 19, 1949 |
| 2,562,743 | Schindler et al. | July 31, 1951 |
| 2,574,702 | Moulton | Nov. 13, 1951 |